United States Patent Office 2,936,308
Patented May 10, 1960

2,936,308

NOVEL REDUCTONES AND METHODS OF MAKING THEM

John E. Hodge, Peoria, Ill., assignor to the United States of America as represented by the Secretary of Agriculture No Drawing. Application June 2, 1955
Serial No. 512,915

16 Claims. (Cl. 260—211)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to new chemical compounds and to methods for making the same. It relates more particularly to certain novel reductones and to methods for making them by converting reducing sugars through the glycosylamines or the corresponding Amadori rearrangement products of these glycosylamines.

The term "reductones" as used in this application refers to the class of unsaturated, di- or poly-enolic organic compounds which, by virtue of the arrangement of the enolic hydroxyl groups with respect to the unsaturated linkages, possess characteristic strong reducing power. These compounds will readily reduce iodine and dichlorophenolindophenol, as well as silver, mercuric, cupric or ferric salts in acidic aqueous solutions. Compounds which are known in the literature to have the above properties are: ascorbic acid (vitamin C), reductic acid, glucic acid (triose-reductone, gluco-reductone), dihydroxymaleic acid, α-α'-dihydroxymuconic acid, pyrogallol and also (according to one authority) hydroquinone (p-dihydroxybenzene), catechol (o-dihydroxybenzene), adrenaline, p-aminophenol and o-aminophenol. In some compounds, such as the last two named, an amino group, a mono-substituted amino group or an imino group may replace one or more of the enolic hydroxyl groups without affecting the characteristic reducing behavior of the compound. Compounds of this class reduce metallic ions, such as silver, mercuric, ferric, cupric in acid as well as in alkaline solution and have found wide-spread use as reducing agents, antioxidants, photographic developers and medicinals.

The new compounds of this invention are derived from sugars, especially glucose, although other 6 carbon sugars are included, as will be apparent from the following specification.

The glycosylamines which may be used as starting materials in the process of this invention and the corresponding Amadori-rearranged products have the following typical structural formulas:

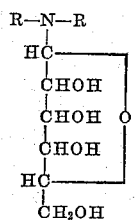

N-substituted glycosylamines
(N-glycosides)
(pyranose ring form)

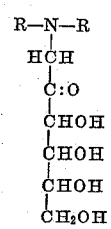

Amadori rearrangement products
(1-amino-1-deoxy-2-ketoses)
(open-chain form)

in which R may be the same or different organic radical, such as alkyl, aryl, or aralkyl. In addition, the two radicals R may be joined by an alkylene chain, such as in the piperidyl radical or an oxygen interrupted alkylene chain such as the morpholinyl radical. The radicals R may be substituted by various radicals or substituents which are inert. One of the radicals, R, may also be hydrogen. Examples of particular substituents are ethyl, propyl, butyl, hexyl, hydroxymethyl, hydroxypropyl, tolyl, benzyl, phenyl and the like.

As disclosed in my copending application Serial Number 256,587, filed November 15, 1951, now U.S. Patent No. 2,715,123, the Amadori rearrangement may be carried out by heating the glycosylamine in the presence of a secondary amine and a compound which possesses an active hydrogen atom linked to a carbon atom in the alpha position to an unsaturated linkage, said compound being non-acid in character. As further disclosed in said application, examples of such compounds are methyl malonate, ethyl malonate, ethyl acetoacetate, ethyl cyanoacetate, phenylacetone, fluorene, and the like.

I have discovered that the glycosylamines or their corresponding Amadori rearrangement products may be converted by heating to novel amino-glycose-reductone products which possess exceptional reducing power, antioxidant properties, and are particularly adaptable as oxygen scavengers and antioxidants. I have further discovered that my novel reductones may be prepared directly by heating a hexose reducing sugar and a secondary amine (corresponding to the N-substituents of the foregoing structural formula). The reaction is hastened by the presence of a reductone-forming catalyst which will be described in detail subsequently. This latter method affords a direct synthesis, and possesses the attendant advantage of avoiding the necessity for the separation of either the glycosylamine or its rearranged aminodeoxyketose product. The foregoing methods are each illustrated in the examples.

The phenomenon of the formation of the novel reductone is characterized by the chemical removal of two molecules of water from one molecule of the glycosylamine or the rearranged aminodeoxyketose product. When the hexose reducing sugar and secondary amine are used as starting materials, a total of three molecules of water are removed. It is therefore advisable to conduct the conversion in an environment that is substantially free of water. The presence of minor amounts of water, however, is not detrimental.

It is not necessary to provide a reaction medium, as the reaction proceeds upon heating the dry materials. The reaction will proceed spontaneously, though at a slow rate, upon permitting the N-substituted glycosylamine or its rearranged aminodeoxyketose product to stand at room temperature. To provide reasonable reaction times (10–24 hours) without too much unwanted decomposition, the reaction temperatures may be held within the range 60–90° C. The specific examples illustrate reaction times within this temperature range for the formation of the reductones in 6 to 24 hours, and show that shorter times of about 2 hours are sufficient at higher temperatures. They also show that the reaction proceeds very slowly unless heated above room temperatures (25° C.).

I prefer to employ an aldohexose, such as D-glucose, D-galactose or D-mannose, or a ketose, such as D-fructose or L-sorbose as the carbohydrate starting material.

The amine starting material may be any secondary amine, including aliphatic, aromatic, aralkyl, alicyclic and heterocyclic amines and amino acids. Colorless or lightly colored macrocrystalline products are obtained.

For the sake of convenience and expedience, I prefer to conduct the reaction in an inert organic solvent such as ethanol, methanol, and the like. Other solvents within the scope of this invention are pyridine, liquid ammonia, acetone, ether and dioxane.

As previously mentioned, the reaction is hastened by heating in the presence of reductone-forming catalytic agents. These agents are the mineral acids, such as phosphoric and boric, carbonic acid, organic mono- and polycarboxylic acids or their amine salts such as acetic acid, piperidine acetate, morpholine acetate, ethylamine acetate, malonic acid, piperidine malonate, dibutylamine malonate, propionic acid, propionates, benzoic acid, benzoates, phthalic acid, phthalates, succinic acid, succinates, citric acid, citrates, glycine, asparagine, glutamic acid and the like. Those acid agents which can exist in anhydride form may also be used in that form, since the water generated by the reaction will hydrate them. All of the foregoing catalysts, in addition to those disclosed in the patent are either acids or acidic compounds.

The quantity of reductone-forming catalytic agent may vary over wide limits, from less than 0.01 mole per mole of aldose sugar up to more than equimolecular amounts based on the aldose sugar or the amine employed. I have found that the smaller amounts provide satisfactory results, yet the time of conversion is considerably lessened by using from 0.5 mole to slightly over one mole for each mole of aldose, aldosylamine or aminodeoxyketose. I prefer to use about equimolar proportions of acid and amine.

In the examples which follow, Examples XX, XXI, and XXII relate to a type of compound which I shall refer to as anhydro-amino-glycose-reductones. The compounds, however, are not to be confused with anhydro or dehydrated sugar derivatives that are known in the art. They are prepared by the elimination of 1 mole of H$_2$O from the molecule of the amino-glycose-reductone. This is carried out under essentially anhydrous or non-hydrolyzing conditions, and may be accomplished by treatment with hydrogen chloride or other dehydrating agents. The agent employed in the examples is hydrogen chloride, but any other strongly acidic chemically dehydrating agent having an affinity for water may be used. I may use, for example, in the process of these three examples, sulfuric acid, phosphoric acid, any one of the phosphoric anhydrides, glacial acetic acid, acetic anhydride, or other carboxylic acid anhydrides, or zinc chloride. The anhydro compounds may also be prepared merely by heating the hydrochloride salts of the amine-glycose-reductones or their salts of other strong acids.

It is to be understood that my anhydro-reductones are not the result of the mere removal of water between two hydroxyl groups, or the removal of physically associated water in the form of moisture. The anhydro-animo-glycose-reductones have entirely different chemical structure from their parent compounds, even though the reductone function remains in the anhydro derivatives. For example, the amino-hexose-reductones, RR'N·C$_6$H$_7$O$_3$, contain one terminal methyl group bound to carbon. This grouping is lost during the formation of the anhydro compounds. The latter contain no such terminal methyl group. Ultra-violet absorption spectra also show a difference in structure between the anhydro derivative and its parent compound.

Considering the reducing sugar and the secondary amine as starting materials, the courses of the reaction of this invention are as follows:

Step I
$$C_6H_{12}O_6 + HNRR \xrightarrow{-H_2O} C_6H_{11}O_5NRR$$
(reducing sugar) (amine) (glycosylamine)

Step II
$$\xrightarrow{\text{Amadori rearrangement}}$$

Step III
$$C_6H_{11}O_5NRR \xrightarrow{-2H_2O} C_6H_7O_3NRR$$
(desoxyaminoketose) (aminoglycose-reductone)

Step IV
$$C_6H_7O_3NRR \xrightarrow{-H_2O} C_6H_5O_2NRR$$
(anhydro-aminoglycose-reductone)

where the R's have the same significance as defined above.

Written differently, the glycoslyamine, desoxyaminoketose, aminoglycose reductone, and anhydroaminoglycose reductone may be designated as $C_6H_{11}O_5A$, $C_6H_{11}O_5A$, $C_6H_7O_3A$, and $C_6H_5O_2A$, respectively, where A is the residue or radical of the secondary amine as above-defined.

The conversion to the amino-hexose-reductones may thus be a combination of steps I, II and III, as previously noted; it may be a combination of steps II and III; or it may be step III, alone.

As will be illustrated in the examples, the instances of combined steps afford direct paths for the syntheses, and each possesses the advantages previously noted. Step I and step II are both catalyzed by acids; hence the acidic reductone-forming catalyst also hastens the preliminary reactions when it is added together with the reducing sugar and the amine at the beginning of the reaction. Furthermore, inasmuch as the reductone formation, step III, probably proceeds to a considerable extent during the progress of the rearrangement (step II) when a reductone-forming catalytic agent is present, and moreover, since step II probably proceeds to a considerable extent during the formation of the glycosylamine (step I) it may be seen that the combinations of steps affords greater net yields of reductone.

The nitrogenous reductone, which is the product of step III of the reaction as given above, consists of two separable radicals: The amine radical, —NRR, and the reductone radical, C$_6$H$_7$O$_3$. The two radicals which comprise the nitrogenous reductone can be separated by hydrolysis to yield as products: the amine, HNRR, and the nitrogen-free reductone, C$_6$H$_8$O$_4$. The nitrogen-free reductone has the same strong reducing behavior in acid solution toward silver nitrate, iodine, dichlorophenolindophenol, mercuric chloride and ferric chloride as the nitrogenous reductone. Since the presence of the amine radical confers salt-like character, crystallinity and stability upon the molecule, I prefer to isolate and store the nitrogenous compound, rather than the nitrogen-free reductone. The true reductone may be considered to be the nitrogen-free moiety which is released upon hydrolysis, rather than the nitrogenous amino-glycose-reductone which is isolated and stored.

The nitrogen-free reductone can be liberated merely by dissolving the nitrogenous reductone in water; however, the hydrolysis may be hastened and carried to completion by heating the aqueous mixture and/or by adding an acidic catalyst, such as hydrochloric acid, sulfuric acid, oxalic acid, picric acid, or the acid form of a cation-exchange resin (see Example XIX).

Referring again to the courses of reaction characterizing this invention, it is practically convenient to consider steps I, II and III in a group, as in the foregoing paragraphs; and to consider step IV separately. This is true, although there is a technical continuity between steps III and IV as will be explained subsequently.

In practice the product of step III is separated as by crystallization or evaporation of the solution. The product is then heated under anhydrous or non-hydrolyzing conditions in the presence of the strongly acidic chemically dehydrating agent as previously discussed.

Separation of the amino-hexose-reductone, product of step III affords the elimination of sugar decomposition products by filtration. It also, of course, involves the elimination of water from the product preparatory to step IV.

Nevertheless, steps III and IV can be carried out as a unitary step if desired. At the completion of the formation of the amino-hexose-reductone, anhydrous acid or acid anhydride may be added to the reaction mixture.

Thereupon water is continuously removed from the reaction medium, and step IV proceeds as the water content falls and the conditions tend toward the anhydrous.

The foregoing procedure of step IV is not to be confused with the step of preparing the nitrogen-free reductone previously described. The former (step IV), involves the removal of one mole of $H_2O$ from the aminohexose-reductone molecule whereas the latter involves the separation of the amine (NRR) group by hydrolysis.

This application is a continuation in part of Serial Number 405,262, filed January 20, 1954, now abandoned.

The following specific examples illustrate the invention:

EXAMPLE I (a) A commercial grade of anhydrous glucose, 180 g. (1.00 mole), was added in portions to 110 g. (1.30 moles) of piperidine (practical grade, B.P. 98–108°) which was preheated to 65° C. and stirred mechanically in a 2-liter, 3-necked flask. The flask was fitted with a thermometer, stirrer and removable reflux condenser.

The mixture was rapidly stirred at 65–70° C. for ten minutes, whereafter it became homogeneous due to condensation of the glucose and the piperidine to form N-glucosylpiperidine. The amber solution was heated ten minutes longer at 70° C. to insure maximum formation of N-glucosylpiperidine. (In previous experiments crystalline N-glucosylpiperidine was isolated from the reaction solution at this point in 84–87 percent yield.)

The heating bath and reflux condenser were removed and with continued stirring crystalline malonic acid, 40 g. (0.38 mole), was added gradually over five minutes. The solution became viscous and dark red in color; the temperature rose to 90° C. Absolute ethanol (150 ml.) was added, thinning the pasty mass and reducing the temperature to 70° C. The heating bath and reflux condenser were then replaced and heating was resumed. (In previous experiments crystalline 1-deoxy-1-piperidino-fructose was isolated in 22–30 percent yields at this stage.)

The dark red-brown solution was heated at 80° C. for ten hours. Crystallization of the reductone product began after seven hours of heating. After cooling the flask at 0° C. for two days the crystalline product was filtered off and washed with ethanol and acetone; yield 40 g., tan-colored crystals, M.P. 230–232° C. with slow decomposition above 210° C.

The filtrate with the washings from the first crop of crystals was heated at 90–95° C. on the steam pot for eight hours, during which time most of the solvent was evaporated. After cooling at 0° C. a second crop of crystals, 4 g., M.P. 228–230° C. with decomposition, was obtained. The total yield was 44 g. or 21 percent of the amount theoretically possible from one mole of glucose.

The product was recrystallized from 3 liters of boiling absolute alcohol, yielding 36 g. of nearly white crystals, M.P. 230–232° C. with decomposition.

Analysis of the recrystallized product gave 62.6 percent C, 8.08 percent H, 6.59 percent N; calculated for $C_{11}H_{17}O_3N$: 62.5 percent C, 8.11 percent H, 6.63 percent N. The molecular weight, as determined in methanol by the Signer method, was 239; calculated for $C_{11}H_{17}O_3$: 211. By iodine titration of a solution of the compound in dilute acetic acid held under a nitrogen atmosphere, the molecular weight (calculated on the basis of two equivalents of iodine consumed per mole of compound) was 211. Acidic solutions of the compound also reduced silver, mercuric and ferric salts, as well as 2,6-dichlorophenolindophenol (two equivalents per mole). This strong, quantitative reducing behavior classifies the organic compound as a reductone, namely piperidino-hexose-reductone.

A saturated aqueous solution of piperidino-hexose-reductone (0.25 percent) was neutral (pH 6) and optically inactive. It shows maximum light absorption in the ultraviolet at 3085 A. Analysis for acetic acid after chromic acid oxidation of piperidino-hexose-reductone by the Kuhn-Roth method showed the presence of one terminal methyl group

in the compound.

Piperidino-hexose-reductone, $C_{11}H_{17}O_3N$, gave a mono-O-methyl ether derivative, $C_{12}H_{19}O_3N$, M.P. 143–144° C.; a di-O-methyl ether derivative, $C_{13}H_{21}O_3N$, M.P. 58–59.5° C.; and a mono-O-acetyl ester derivative,

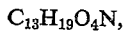

M.P. 169° C. These derivatives did not possess reductone reducing power in neutral solutions.

(b) To obtain a derivative of piperidino-hexose-reductone which was extensively soluble in water, without loss of the reductone reducing power, it was converted to the hydrochloride salt as follows: Piperidino-hexose-reductone, 211 g. (1.00 mole), was completely dissolved in 1,500 ml. of n-butanol which contained 10% hydrogen chloride by weight. After 5 minutes at 25° C., precipitation of the hydrochloride began. After standing for 18 hours at 25° C., the crystalline precipitate was filtered off, washed with n-butanol and ether until colorless, then dried in a vacuum desiccator over anhydrous calcium chloride. Yield 217 g., 88 percent of theory, M.P. 153–163° C. with decomposition. The aqueous solution of this compound was strongly acidic and reduced 2,6-dichlorophenolindophenol solution very quickly at 25° C. On dissolving the product in water and adding basic sodium acetate solution, the original non-acidic piperidino-hexose-reductone, $C_{11}H_{17}O_3N$, M.P. 232–233° (decomposition), was crystallized and was recovered.

EXAMPLE II

Anhydrous glucose, 90 g. (0.50 mole), was stirred with absolute ethanol (100 ml.) under an atmosphere of nitrogen in a one-liter flask fitted as described in Example I. Piperidine (B.P. 105–107° C.), 55 g. (0.65 mole), was added and the mixture was stirred at 70–75° C. for a period of one-half to one hour until all the glucose was dissolved and a clear, golden-yellow solution was produced.

Glacial acetic acid, 39 g. (0.65 mole), was dissolved in absolute ethanol (50 ml.) and the mixed solution was added dropwise to the golden-yellow solution over a period of twenty minutes. The color of the reaction solution changed to a deep red during the addition of acid. After heating the clear, red solution under nitrogen and under reflux at 75° C. for six hours, seed crystals of the crystalline reductone, $C_{11}H_{17}O_3N$, obtained as described in Example I, were added. The product then crystallized from the reaction mixture (now a dark red-brown, caramel-like color) on further heating.

After a total of twelve hours of heating at 75° C., the reaction mixture was cooled and kept at 0° C. for one day, then filtered. The crystals were washed with ethanol on the filter until free of adhering mother liquor, then dried in a vacuum desiccator over anhydrous calcium chloride. The yield was 28 g., or 27 percent of the amount theoretically possible from 0.50 mole of glucose. The crystals melted at 229–232° C. with decomposition, reduced exactly two equivalents of iodine per mole (calculated for a molecular weight of 211.3 and titrated in 0.02 N acetic acid solution), and was identical in all properties with the reductone compound, $C_{11}H_{17}O_3N$, described in Example I.

The mother liquor from the above product was concentrated in a vacuum (20 mm.) at 35° C. until no more distillate was obtained. The thick, sirupy residue was then heated at 85° C. under reflux for six hours. Upon seeding, cooling to 0° C., filtering, washing and drying, 4 g. more of the same compound, $C_{11}H_{17}O_3N$, M.P.

229-232° C. with decomposition, was obtained. The total yield was therefore 32 g., or 30 percent of the theoretical amount.

The experiment was repeated six times (Expts. 1-6) as described above with variation only in the amount of glacial acetic acid added. In three other experiments (Nos. 7-9) the amounts of piperidine, solvent and the reaction temperature were varied. The results are summarized in the following table:

Table I

| Expt. No. | Glacial Acetic Acid Added | | Yield of reductone isolated after 12 hours heating at 75° C. (percent of theory based on glucose) |
|---|---|---|---|
| | Moles per mole of glucose | Moles per mole of piperidine | |
| 1 | 0.2 | 0.15 | 9 |
| 2 | 0.3 | 0.23 | 16 |
| 3 | 0.5 | 0.38 | 16 |
| 4 | 1.0 | 0.77 | 25 |
| 5 | 1.3 | 1.00 | 27 |
| 6 | 1.5 | 1.15 | 24 |
| 7 [1] | 1.0 | 1.00 | 19 |
| 8 [2] | 1.3 | 1.00 | 22 |
| 9 [3] | 1.3 | 1.00 | 22 |

[1] Only one mole of piperidine was added per mole of glucose.
[2] No solvent (ethanol) was added.
[3] The temperature was raised to 85±3° C.

The experiment also was repeated with variation only of the type of sugar used. The reactant concentrations and other reaction conditions were maintained as given above. The results are recorded in Table II.

Table II

| Name of reducing sugar | Sugar type | Yield of crystalline reductone (percent) of theory | Formula of reductone |
|---|---|---|---|
| D-glucose | aldohexose | 27 | $C_{11}H_{17}O_3N$ |
| D-mannose | do | 25 | $C_{11}H_{17}O_3N$ |
| D-galactose | do | 25 | $C_{11}H_{17}O_3N$ |
| D-fructose | ketohexose | 16 | $C_{11}H_{17}O_3N$ |
| L-sorbose | do | 11 | $C_{11}H_{17}O_3N$ |
| L-rhamnose | aldo-6-deoxyhexose | 26 | $C_6H_8O_3$ |
| D-xylose | aldopentose | (*) | |
| DL-glyceraldehyde | aldotriose | (*) | |
| dihydroxyacetone | ketotriose | (*) | |
| maltose | aldo-disaccharide | (*) | |

*No crystalline product was isolated; however, 5 mg. of each of the final reaction mixtures quickly reduced 10 ml. of 0.03 percent 2,6-dichlorophenolindophenol in acetic acid solution within 10 seconds, indicating the presence of one or more reductone compounds.

EXAMPLE III

The experiment described in Example II was repeated, except that beta-mercaptopropionic acid $$HS \cdot CH_2 \cdot CH_2 \cdot COOH$$

was used as the catalyst instead of acetic acid. Only 0.50 mole of beta-mercaptopropionic acid was added per mole of glucose. After 15 hours of heating at 85° C., the same reductone compound isolated in Examples I and II, $C_{11}H_{17}O_3N$, M.P. 229-232° C. with decomposition, was isolated. Yield, 11 g. The crude crystalline product was only pale yellow in color in contrast to the darker brown crude product which was obtained under the same conditions using malonic or acetic acid as the catalyst.

EXAMPLE IV

The experiment described in Example II was repeated, except that acetic anhydride (1.0 mole per mole of glucose) was used as a combination dehydrating agent and catalyst. The crystalline compound isolated was identical in every way with that obtained in Examples I, II and III. Yield, 5 g.

EXAMPLE V

The experiment described in Example II was repeated, except that meta-phosphoric acid was used as a combination acid catalyst and dehydrating agent, instead of acetic acid. Glucose (0.50 mole), piperidine (0.65 mole), absolute ethanol (150 ml.) and "meta-phosphoric acid" 40 g. (ground to a powder in a mortar) were stirred together and heated under nitrogen and under reflux with continuous stirring for twenty hours at 75° C. The "meta-phosphoric acid" was a commercial preparation (solid stick form) which contained approximately 35 percent $HPO_3$ and 60 percent sodium meta-phosphate, $NaPO_3$. Hence, only 0.18 mole of $HPO_3$ actually was present. After cooling and filtering the reaction mixture, 75 g. of dry, crystalline solids was isolated. The solids were washed twice with water to remove sodium phosphate, leaving 24 g. of white, phosphate-free reductone, $C_{11}H_{17}O_3N$, M.P. 229-232° C. with decomposition. The yield was 23 percent of the theoretical amount. Titration of the compound in dilute acetic acid with standard iodine solution gave the expected result: 2.00 equivalents of iodine were reduced per mole (211.3) of the compound.

EXAMPLE VI

One mole of anhydrous glucose, 180 g., was heated and stirred with one mole of piperidine, 85.5 g., in 250 ml. methanol at 70° C. until a clear yellow solution of N-D-glucosylpiperidine was obtained (20 minutes). Ortho-phosphoric acid of 100 percent concentration, 39 g., 0.4 mole, was then slowly added to the stirred solution. Heating was continued under reflux at 75° C. for 18 hours. After 8 hours a crystalline precipitate was continuously present. The mixture was cooled to 2° C., then the crystals were isolated by filtration. Yield 43 g., 20 percent of theory, prismatic crystals discolored yellow. Recrystallization of the product from 24 volumes of boiling methanol gave 31 g. of nearly colorless crystals which melted with decomposition at 235° C. Calculated for piperidino-hexose-reductone, $C_{11}H_{17}O_3N$: N, 6.63; mol. wt. 211; found by analysis; N, 6.6; mol. wt. 211 (iodine titration).

EXAMPLE VII

Carbon dioxide may be used as the reductone-forming catalyst. The experiment cited in Example VI was repeated; however, instead of adding phosphoric acid, a stream of carbon dioxide gas was passed continuously through the reaction mixture. Piperidino-hexose-reductone, M.P. 232-233° C. with decomposition, was isolated in 7 percent of the theoretical yield.

EXAMPLE VIII

Morpholino-hexose-reductone

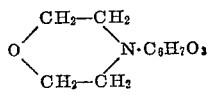

(a) The experiment described in Example II was repeated, except that piperidine was replaced by the less costly amine, morpholine. Morpholine, $C_4H_9ON$, B.P. 124-126° C., was added to the extent of 0.65 mole or 1.30 moles per mole of glucose. After the addition of glacial acetic acid (0.4 mole per mole of glucose) in ethanol, the deep red reaction mixture was heated under nitrogen and under reflux for sixteen hours at 87° C. Crystallization occurred after cooling and standing at 0° C. The product was isolated as described for the piperidine derivative. Yield, 29 g. (27 percent of theory, based on glucose).

Recrystallization of the product from boiling methanol (350 ml.) gave 25 g. of yellow-tinged crystals, M.P. 215-216° C. with decomposition, which were 99.5 percent pure by iodine titration. Analysis of the recrystallized product gave 56.6 percent C, 7.05 percent H, 6.58 percent N. Calculated for $C_{10}H_{15}O_4N$: 56.3 percent C, 7.09 percent H, 6.56 percent N. The compound, morpholino-hexose-reductone, showed the same strong reducing behavior toward silver nitrate, iodine and 2,6-dichlorophenolindophenol in acidic solutions as the piperidino-hexose-reductone which was isolated in the preceding examples. Analysis for acetic acid, after chromic acid oxidation by the Kuhn-Roth procedure showed the presence of one terminal methyl group in each molecule of the morpholino-hexose-reductone.

(b) The experiment described in part (a) above was repeated, but with heating for thirty minutes only after the addition of acetic acid. After cooling, allowing to stand at 0° C. for several days and re-processing the mother liquor, a total of 29 g. (23 percent of theory) of the Amadori rearrangement product, 1-deoxy-1-morpholinofructose, $C_{10}H_{19}O_6N$, was isolated as colorless prisms, 147–148° C. A mixture of the compound with an authentic sample of 1 - deoxy - 1 - morpholinofructose also melted at 147–148° C. Since the compound did not reduce silver nitrate or 2,6-dichlorophenolindophenol in acid solution, it possessed no reductone properties. However, it did reduce 2,6-dichlorophenol-indophenol in dilute sodium hydroxide solution at 25° C., a reducing action which is characteristic of the 1-amino-1-deoxy-2-ketoses. This experiment shows that the Amadori rearrangement product is an intermediate which is formed in the reductone-producing reaction. Examples XV and XVI show that crystalline piperidino-hexose-reductone can be formed starting with the Amadori rearrangement product, 1-deoxy-1-piperidinofructose.

(c) Repetition of the experiment described in part (a), but at the lower temperature of 73° C., gave 1-deoxy-1-morpholinofructose, M.P. 147–148° C., in 37 percent of the theoretical yield based on glucose.

(d) Morpholino-hexose-reductone, prepared as described in part (a), was converted to the hydrochloride salt by stirring one molecular equivalent in 4 to 5 parts by weight of n-butanol solution which contained 9 percent by weight of anhydrous hydrogen chloride. After heating the slurry for 5 minutes at 50 to 60° C., the crystals were filtered, washed with n-butanol and ethyl acetate, then dried in a vacuum desiccator over calcium chloride. The yield was 95 percent of theory. Recrystallization from ethanol gave nearly colorless crystals which melted with much decomposition at 160° C.

Calcd. for $C_{10}H_{16}O_4NCl$: C, 48.1; H, 6.46; N, 5.62; Cl, 14.2. Found by analysis: C, 48.6; H, 6.42; N, 5.67; Cl. 13.9.

The product was more soluble in water than morpholino-hexose-reductone, yielding a strongly acidic solution which quickly reduced 2,6-dichlorophenolindophenol at 25° C. Chromic acid oxidation gave 0.94 mole of acetic acid per mole which demonstrated the continued presence of one terminal methyl grouping in the reductone radical.

EXAMPLE IX

Dimethylamino-hexose-reductone

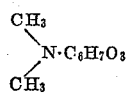

Anhydrous glucose, 720 g. (4.00 moles), was suspended in one liter of methanol and 200 g. (4.44 moles) of liquid dimethylamine was added at 0° F. Glacial acetic acid, 245 g. (4.08 moles) was dropped into the reaction mixture while stirring continuously under an atmosphere of nitrogen. The temperature rose during the acid addition and most of the glucose dissolved. The mixture was then heated by steam at the reflux temperature of 74° C. for 25 hours. One liter of solvent was removed from the dark red-brown reaction mixture by vacuum distillation, whereupon crystallization of the product began. After cooling at 2° C. for one day, the crystalline reaction product was isolated by filtration and washed with methanol and acetone until free of mother liquor. The vacuum desiccator-dried product, orange prismatic crystals, weighed 160 g. (23.4 percent of theory based on glucose; 21.1 percent based on dimethylamine). Recrystallization of the product from two liters of methanol gave 98 percent recovery (3 crops) of bright orange crystals, M.P. 213–214° C. (decomposition).

Calcd. for $C_8H_{13}O_3N$: C, 56.1; H, 7.65; N, 8.18; mol. wt., 171. Found by analysis: C, 56.4; H, 7.66; N, 8.14; mol. wt., 172.

The crystalline product, dimethylamino-hexose-reductone, when dissolved in dilute acetic acid, reduced two equivalents of 2,6-dichlorophenolindophenol or of iodine at 25° C.

EXAMPLE X

Diallylamino-hexose-reductone

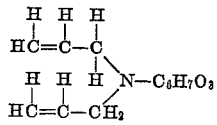

Following the procedure given in Example II, substituting 0.65 mole of diallylamine for piperidine, a small crop of light tan crystals was isolated in 6 percent of the theoretical yield based on glucose. After recrystallization from methanol, the nearly colorless product melted at 175° C. to 177° C. with decomposition.

Calcd. for $C_{12}H_{17}O_3N$: C, 64.6; H, 7.68; N, 6.27. Found by analysis: C, 64.7; H, 7.76; N, 6.23.

The compound, diallylamino-hexose-reductone, reduced 2.02 equivalents of iodine per mole in dilute acetic acid solution. 2,6-dichlorophenolindophenol solution also was reduced rapidly to the colorless form at 25° C., indicating the presence of a reductone structure.

EXAMPLE XI

Di-n-butylamino-hexose-reductone

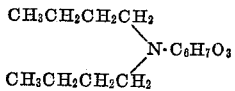

Anhydrous glucose, 180 g. (1.00 mole); di-n-butylamine, 168 g. (1.30 moles ); glacial acetic acid, 79 g. (1.30 moles); and methanol (100 ml.) were stirred under an atmosphere of nitrogen while heating under reflux at 85° C. for 12 hours. The dark red-brown reaction mixture was then continuously extracted with one liter of pentane-hexane, B.P. 35° C. to 45° C., for 2 days. Distillation of the petroleum ether extract yielded a sirupy residue which partially crystallized after storage at 0° C. Filtration yielded 8.7 g. of crude crystalline product (3.5 percent of theory based on glucose). After two recrystallizations from acetone, the crystals were colorless, M.P. 142–143° C.

Calcd. for $C_{14}H_{25}O_3N$: C, 65.9; H, 9.87; N, 5.49; mol. wt., 255. Found by analysis: C, 66.1; H, 9.87; N, 5.54; mol. wt., 255.

The compound, di-n-butylamino-hexose-reductone, reduced iodine and 2,6-dichlorophenolindophenol rapidly at 25° C. in dilute acetic acid solution. Exactly two equivalents of iodine were reduced per mole of compound.

EXAMPLE XII

Piperazino-di-(hexose-reductone)

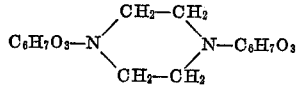

Anhydrous glucose, 36 g. (0.20 mole); piperazine, 8.9 g. 98 percent pure (0.10 mole); glacial acetic acid, 12 g. (0.20 mole); and ethanol (30 ml.) were heated together with mechanical stirring, under reflux and under a nitrogen atmosphere, for 22 hours at 80° C. The tan, crystalline powder which separated on cooling was filtered off, washed with hot methanol and acetone, then allowed to hydrate until in equilibrium with atmospheric humidity (65 percent relative humidity). The yield was 2.3 g., 3.3 percent of theory based on glucose.

Calcd. for $C_{16}H_{22}O_6N_2 \cdot H_2O$: C, 53.9; H, 6.79; N, 7.86. Found by analysis: C, 53.9; H, 6.81; N, 7.86.

The mole of water of hydration could be removed by drying in a vacuum (0.3 mm. mercury) at 100° C. The dried product was hygroscopic. It reduced 3.8 equivalents of iodine per mole in acetic acid solution, showing the presence of two reductone (enediol-α-carbonyl) groupings in combination with the bi-functional piperazino radical.

EXAMPLE XIII

Crystals of N-galactosylpiperidine (10 g.) were allowed to stand in a screw-capped bottle for 29 months at 25° C. The crystals coalesced to a dark-brown heterogeneous mass. The tarry mass was extracted with 1:1 methanol-acetone, yielding as a residue 1.7 g. of tan-colored crystals (20 percent of the theoretical yield), M.P. 225–227° C. with decomposition. When the compound was recrystallized twice from methanol it showed the same melting point, analysis, and reducing properties as the product described in Example I.

EXAMPLE XIV (a) Crystals of N-galactosylpiperidine (5.0 g.) were heated in a tube in an Abderhalden drying apparatus over boiling water (98–100° C.) at 0.2–0.3 mm. of mercury pressure for two hours. The crystals slowly turned brown and coalesced to a dark red-brown residue. The residue was extracted with 1:1 methanol-acetone yielding 0.3 g. of insoluble crystalline product which was identical in all properties with the reductone described in Example I.

(b) The experiment was repeated with N-glucosylpiperidine (piperidine-N-glucoside), heating for 4 hours at 98–100° C. The crystalline product was identical with that of Example I.

EXAMPLE XV 1-deoxy-1-piperidinofructose (6.0 g.), the Amadori rearrangement product of N-glucosylpiperidine (see Example I), was heated in an Abderhalden apparatus as described in Example III for N-galactosylpiperidine, except that boiling toluene vapors were used as the heating bath to produce a temperature of 108–110° C. After heating for 5 hours, a crystalline reductone compound (0.4 g.) was isolated from the residue (3.3 g.) in 8 percent of the theoretical yield. This compound was identical in all properties with the reductone described in Example I.

EXAMPLE XVI 1-deoxy-1-piperidinofructose, 5.0 g. (20 mmoles), was suspended in absolute ethanol. Piperidine (B.P. 105–107°), 2.3 g. (27 mmoles) and glacial acetic acid, 1.6 g. (27 mmoles) were added, then the solution was heated under reflux for 7 hours. The dark red-brown solution was stored at 0° C. for three days. The crystalline precipitate was filtered off, washed well with ethanol-acetone (1:1), then with acetone, and dried. The yield was 0.4 g. or 9.4 percent of the theoretical amount; M.P. 228–232° with decomposition. After recrystallization from methanol, the crystals were identical in every way with those described in Example I.

EXAMPLE XVII

Crystalline N-galactosylpiperidine, 5.0 g. (20 moles), was dissolved in hot absolute ethanol (25 ml.) and ethyl malonate (25 ml.) was added. The colorless solution was heated under reflux on the steam bath for 90 minutes whereupon it became deep red-brown in color. Diethyl ether (100 ml.) was added to the cooled solution and the solution was stored at 0° C. for 2 months. No crystalline product was obtained. The liquor was then kept at 25° C. for 4 months and, after seeding with crystals of the crystalline reductone, $C_{11}H_{17}O_3N$, several large prismatic crystals formed. Yield 0.4 g. When recrystallized from ethanol the crystals melted at 230–232° (with decomposition) and were identical in all properties with the compound described in Example I.

EXAMPLE XVIII

This example consists of two parts (a) and (b) which illustrate the reaction in the case of glucose and a primary amine and (b) an N-glucosyl derivative of a primary amine.

(a) Anhydrous glucose, 18 g. (0.10 mole), benzylamine, 13 g. (0.12 mole), boric anhydride, 7.0 g. (0.10 mole) and ethanol (250 ml.) were stirred together in a flask attached to a reflux condenser and heated on a steam bath for 3 hours. Deep red-brown color soon formed and a strongly exothermic reaction took place to produce an insoluble chocolate-brown product. After cooling, the product was removed by filtration, washing with alcohol and ether and drying in a vacuum over anhydrous calcium chloride for several days. Yield, 30 g. The product was practically insoluble in water, alcohol, acetone and ether; yet acidic suspensions of the product reduced silver nitrate, 2,6-dichlorophenolindo-phenol and iodine in the manner of reductones.

(b) Dry crystals of N-glucosylmonoethanolamine, M.P. 116° C., (30 g), was kept at 25° C. in a closed bottle for 20 months. The originally white crystals slowly turned brown and coalesced to a dark brown tar. The tar was extracted 4 times with a mixture of methanol (1 part by volume) and acetone (4 parts), then the residue was dissolved in methanol and precipitated by adding acetone with stirring. After repeating the precipitation process twice, a chocolate-brown, melanoidin-like powder was obtained which was dried in a vacuum over anhydrous calcium chloride. Yield, 18 g. The product gave the following analyses: 50.3 percent C, 7.45 percent H and 5.95 percent N. Since the starting material contained only 43.1 percent C it was apparent that a spontaneous dehydration had occurred. An aqueous solution of the product (pH 6.7) reduced 2,6-dichlorophenolindophenol and acid silver nitrate solution rapidly at 25° C., indicating a reductone structure in the product.

EXAMPLE XIX

The following example shows that the crystalline reductone, $C_{11}H_{17}O_3N$, can be hydrolyzed to yield (a) piperidine and (b) a nitrogen-free reductone.

(a) The crystalline reductone, $C_{11}H_{17}O_3N$, 0.63 g. (3 mmoles), and picric acid, 0.69 g. (3 mmoles) were dissolved in water (80 ml.) at 85° C. After heating at 85° C. for 30 minutes the solution was concentrated under reduced pressure to a small volume (5–10 ml.) whereupon crystallization occurred. The yellow crystals were filtered off, washed with water and dried; yield 0.60 g., M.P. 149–150° C. After recrystallization from ethanol the compound melted at 150–151° C. An intimate mixture of the recrystallized compound with piperidine picrate (M.P. 150–151° C.) showed no lowering of the melting point. This test showed that the compound isolated was piperidine picrate and that the original nitrogenous reductone had been hydrolyzed to yield the amine, piperidine ($C_5H_{11}N$), as one of the products.

(b) The crystalline reductone, $C_{11}H_{17}O_3N$, 1.0 g., was heated in water (50 ml.) at 100° C. for 10 minutes. The aqueous phase remained neutral and only a small amount of the reductone was dissolved. A teaspoonful of wet cation-exchange resin in the free acid form (Amberlite IR-120 treated with 2 N hydrochloric acid, then washed until chloride-free) was then added. After heating only five minutes longer, all of the reductone had dissolved to produce an orange-colored solution. The mixture of solution and ion-exchange resin was heated for one hour at 100° C. with frequent shaking, then it was filtered to remove the resin (with the liberated piperidine attached). A sample of the filtrate was acidic and quickly reduced silver nitrate to black metallic silver at 25° C., showing the presence of a reductone.

The reductone in the filtrate was precipitated as the lead salt by adding 5 milliliters of one normal lead acetate. The lead salt was isolated by centrifuging. After washing with dilute acetic acid and water and drying, the yield was 0.4 g. Analysis showed that the lead salt contained no nitrogen.

The nitrogen-free reductone was liberated from the lead salt (in aqueous suspension) by passing in hydrogen sulfide gas. The precipitate of lead sulfide was removed and the excess hydrogen sulfide was blown out of the solution with nitrogen gas. Titration of an aliquot of the final acidified solution with standard iodine showed that 70 percent of the theoretical amount of nitrogen-free reductone, calculated as $C_6H_8O_4$, was present.

Paper chromatography of the solution showed a single spot (indicated by its reduction of silver nitrate solution to black silver at 25° C.) which had travelled 40 percent of the distance travelled by the solvent front; whereas the original nitrogenous reductone gave a spot that had travelled 79 percent of that distance.

This experiment (b) has shown that the crystalline nitrogenous reductone will yield on hydrolysis a nitrogen-free reductone to which moiety the nitrogenous reductone owes its strong reducing power.

EXAMPLE XX

Anhydro-piperidino-hexose-reductone

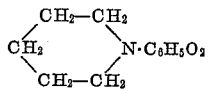

Piperidino-hexose-reductone, 320 g. (1.51 moles) was suspended in 250 ml. of n-butanol and stirred at 60° C. A cold solution of hydrogen chloride (10% by weight) in n-butanol, 1490 g. (4.1 moles of hydrogen chloride), was added and the mixture was heated in a steam bath to 60° C. over a period of 10 minutes. The reaction mixture was then held at 60-70° C. for 20 minutes longer before cooling rapidly to 20° C. The crop of yellow crystals thus obtained was filtered off, washed with n-butanol, ethanol and ether. Finally it was dried in vacuo over calcium chloride to constant weight. Yield 285 g. (82 percent of theory). The crystalline product decomposed from 170 to 180° C.

Calcd. for $C_{11}H_{16}O_2NCl$: N, 6.10; Cl, 15.4. Found by analysis: N, 6.18; Cl, 15.4.

Thus one mole of water had been removed from the piperidino-hexose-reductone and one mole of hydrogen chloride had added to the compound thereby forming the hydrochloride salt. The compound was soluble in water, yielding a strongly acidic solution which rapidly reduced 2,6-dichlorophenolindophenol at 25° C.

Hydrogen chloride was removed from the compound, $C_{11}H_{16}O_2NCl$, by stirring 275 g. (1.20 moles) in one liter of water followed by adding a solution of sodium acetate (1.50 moles) to the stirred slurry. A bright yellow precipitate formed at once. After stirring for 30 minutes under a nitrogen atmosphere, the yellow crystalline product was filtered off, washed with water and dried. Yield 226 g. (98 percent of theory); M.P. 188-191° C. Recrystallization of the product from two liters of ethanol followed by drying in a vacuum oven at 75° C. for 4 hours gave 209 g. of the pure compound, M.P. 196-197° C. with decomposition.

Calcd. for $C_{11}H_{15}O_2N$: C, 68.4; H, 7.82; N, 7.25. Found by analysis: C, 68.2; H, 7.65; N, 7.27.

The compound reduced 2,6-dichlorophenolindophenol solution rapidly at 25° C. in the manner of reductones; however, upon titration with iodine, a dark red-purple color soon developed which obscured the end point. The compound possessed an entirely different structure from piperidino-hexose-reductone, because no terminal methyl grouping was not present (Kuhn-Roth C-methyl analysis). Furthermore, an aqueous solution of the compound showed maximum light absorption at 3525 A.; whereas the starting material, piperidino-hexose-reductone, $C_{11}H_{17}O_3N$, showed maximum light absorption at 3085 A. Because this different type of reductone compound was formed by removal of the elements of water from piperidino-hexose-reductone, it is named anhydro-piperidino-hexose-reductone until its true structure is determined.

EXAMPLE XXI

Anhydro-morpholino-hexose-reductone

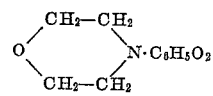

Following the procedure of the preceding example, morpholino-hexose-reductone (0.200 mole) was heated at 80° C. for 20 minutes in 360 ml. of n-butanol solution which contained 29 g. of anhydrous hydrogen chloride. The hydrochloride of the anhydro compound crystallized on cooling and was isolated in 83 percent of the theoretical yield; M.P. 143-145° C. with decompositon. By suspending the hydrochloride compound in sodium acetate solution, red-brown crystals of the anhydro derivative, free of hydrogen chloride, were obtained, M.P. 205-206° C. with decomposition.

Calcd. for $C_{10}H_{13}O_3N$: C, 61.5; H, 6.71; N, 7.18. Found by analysis: C, 61.6; H, 6.79; N, 7.03.

EXAMPLE XXII

Anhydro-dimethylamino-hexose-reductone

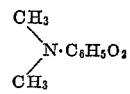

Following the procedure of Example XVIII, dimethylamino-hexose-reductone, 171 g. (1.00 mole) was heated in 1,200 ml. of n-butanol solution which contained 8 percent (wt./vol.) of hydrogen chloride. After heating for a total of 20 minutes at 70-80° C., the hydhochloride salt of the anhynro derivative was isolated in 80 percent yield. When the crystalline hydrochloride of the anhydro derivative was suspended and stirred in sodium acetate solution, it was converted to the hydrogen chloride-free anhydro derivative in 72 percent of the theoretical yield. Orange crystals of M.P. 211-212° C. (decomposition) were obtained.

Calcd. for $C_8H_{11}O_2N$: C, 62.7; H, 7.24; N, 9.15. Found by analysis: C, 63.1; H, 7.24; N, 9.00.

The product, anhydro-dimethylamino-hexose-reductone, when dissolved in aqueous acetic acid, reduced 2,6-dichlorophenolindophenol solution rapidly at 25° C. Upon titration with iodine, a dark, red-purple color developed which obscured the end point.

I claim:

1. A method for producing aminohexose reductones which comprises heating, to a temperature of about from 60° to 110° C. for a period of about 2 to 24 hours in a reaction medium substantially free of water, a hexose reducing sugar with a secondary amine selected from the group consisting of piperidine, piperazine, morpholine, dimethylamine, diallylamine, and di-n-butylamine, said heating taking place in the presence of a catalyst selected from the group consisting of phosphoric acid, boric acid, carbonic acid, acetic acid, acetic anhydride, piperidine acetate, morpholine acetate, ethylamine acetate, malonic acid, piperidine malonate, dibutylamine malonate, propionic acid, beta-mercaptopropionic acid, benzoic acid, phthalic acid, succinic acid, citric acid, glycine, asparagine, and glutamic acid, thereby to produce the corresponding aminohexose reductone, and recovering said aminohexose reductone from the reaction mixture.

2. The process of claim 1 wherein the secondary amine is piperidine.

3. The process of claim 1 wherein the secondary amine is di-n-butylamine.

4. The process of claim 1 wherein the secondary amine is morpholine.

5. Piperidino hexose reductone.

6. Di-n-butylaminohexose reductone.

7. Morpholinohexose reductone.

8. A method for producing anhydro-aminohexose reductones which comprises heating an aminohexose reductone produced by the process of claim 1 to a temperature of about from 60° to 100° C. for a period of about from 10 minutes to 1 hour under substantially anhydrous conditions in the presence of a strongly acidic chemically dehydrating agent to produce the corresponding anhydro-aminohexose reductone, and recovering said anhydro-aminohexose reductone from the reaction mixture.

9. The process of claim 8 wherein the dehydrating agent is hydrogen chloride.

10. The method comprising suspending piperidino-hexose-reductone in butanol, adding hydrogen chloride, heating the reaction mixture and maintaining its temperature at 60°–70° C. for a period of approximately 30 minutes, cooling the reaction mixture rapidly to about 20° C., and recovering anhydro-piperidino-hexose-reductone from the reaction mixture.

11. The method comprising suspending morpholino-hexose-reductone in butanol, adding hydrogen chloride, heating the reaction mixture to and maintaining the temperature at about 80° C. for about 20 minutes, and recovering anhydro-morpholino-hexose-reductone from the reaction mixture.

12. The method comprising suspending dimethylamino-hexose-reductone in butanol, adding hydrogen chloride, heating the mixture to about 70°–80° C. for about 20 minutes, and recovering anhydro-dimethylamino-hexose-reductone from the reaction mixture.

13. Anhydro-amino-hexose-reductone.

14. Anhydro-piperidino-hexose-reductone.

15. Anhydro-morpholino-hexose-reductone.

16. Anhydro-dimethylamino-hexose-reductone.

References Cited in the file of this patent

UNITED STATES PATENTS

| | | |
|---|---|---|
| 2,197,540 | Klug | Apr. 16, 1940 |
| 2,354,846 | Weygand | Aug. 1, 1944 |
| 2,715,123 | Hodge | Aug. 9, 1955 |

FOREIGN PATENTS

| | | |
|---|---|---|
| 727,402 | Germany | Nov. 4, 1942 |

OTHER REFERENCES

Fieser and Fieser: Organic Chemistry, published by Heath, Reinhold Co. (N.Y.), 1950, pp. 55 to 57.

Wendland: Arch. Pharm., vol. 285, pp. 71–79 (1952), abstracted from Chem. Abst., vol. 46, col. 11286bde.